United States Patent [19]
Tai et al.

[11] Patent Number: 5,642,028
[45] Date of Patent: Jun. 24, 1997

[54] COMBINED RECHARGABLE BATTERY AND CHARGER ASSEMBLY

[76] Inventors: Ming-Hwa Tai, 10F, No. 41, Lane 120, Hsin Min St., Tan Shui Chen, Taipei Hsien, Taiwan; Jung-Hung Wang, No. 40, Sec. 2, Huan Shan Rd., Taipei, Taiwan

[21] Appl. No.: 403,937

[22] Filed: Mar. 14, 1995

[30] Foreign Application Priority Data

Apr. 9, 1994 [CN] China .................. 94207904.3

[51] Int. Cl.$^6$ .................. H01M 10/46
[52] U.S. Cl. .................. 320/2; 320/49
[58] Field of Search .................. 370/2, 5, 49; 429/96, 429/97, 98, 99, 100; D13/103, 107, 108; 307/150

[56] References Cited

U.S. PATENT DOCUMENTS

| | | | |
|---|---|---|---|
| 5,160,879 | 11/1992 | Tortola et al. | 320/2 |
| 5,192,904 | 3/1993 | Leiserson | 320/2 |
| 5,254,927 | 10/1993 | Chiang | 320/2 |
| 5,268,629 | 12/1993 | Franke | 320/2 |
| 5,459,389 | 10/1995 | Fujiwara et al. | 320/2 |

*Primary Examiner*—Edward Tso
*Attorney, Agent, or Firm*—Morton J. Rosenberg; David I. Klein

[57] ABSTRACT

A rechargeable battery assembly including a charging circuit and an electric plug assembly for connecting external power supply to the charging circuit, the charging circuit including an AC power input means to receive AC power supply, voltage dropping and power supply rectifying means connected to the AC power input means to drop AC power supply voltage and to change AC power supply into DC power supply, a battery, voltage detection and power supply control means, switch means connected between the voltage dropping and power supply rectifying means and controlled by the voltage detection and power supply control means to charge the battery.

2 Claims, 7 Drawing Sheets

COMBINED RECHARGABLE BATTERY AND CHARGER ASSEMBLY

BACKGROUND OF THE INVENTION

The present invention relates to rechargeable batteries for mobile telephones, and relates more particularly to an assembly which combines a rechargeable battery with a charging circuit for converting AC supply power to DC supply power to charge the battery.

The battery of a mobile telephone must be regularly charged so that sufficient battery power supply can be constantly maintained to insure proper operation of the mobile telephone. Mobile telephones typically draw 60–70 mA of current during standby operation and 600–700 mA of current during calling operation. Therefore, with a mobile telephone battery having a capacity of about 600–700 mAH, a typical mobile telephone can operate for about 10 hours in standby mode or for approximately one hour in the calling mode. In order to charge the battery frequently, a mobile telephone user must carry a battery charger. However, when a mobile telephone battery is frequently charged, a battery memory effect tends to occur, causing the effective capacity of the battery to diminish. If this battery memory effect is not negated, the battery cannot be fully charged to the rated capacity. This battery memory effect greatly shortens the service life of the battery. In addition, when the battery is charged to saturation by a battery charger, the battery charger does not cut off the power automatically; therefore, the battery may be overcharged and thereby damaged. Conventional battery chargers are commonly comprised of a transformer and rectifier circuit for converting AC supply power to DC supply power. The use of a transformer, however, greatly increases the weight and size of the battery charger.

SUMMARY OF THE INVENTION

The present invention addresses the shortcomings in the prior art noted above. It is one object of the present invention to provide a rechargeable battery for mobile telephones which may be charged directly by AC supply power.

It is another object of the present invention to provide a rechargeable battery for mobile telephones which keeps a mobile telephone operating when it is charged.

It is another object of the present invention to provide a rechargeable battery for mobile telephones which facilitates efforts to avoid problems due to battery memory effect.

It is another object of the present invention to provide a rechargeable battery for mobile telephones equipped with a charger which automatically cuts off the supply power when the battery is charged to its saturation point.

It is yet another object of the present invention to provide a rechargeable battery for mobile telephones which is compact and lightweight.

According to the preferred embodiment of the present invention, the rechargeable battery assembly comprises a rechargeable battery, a charging circuit, and an electric plug assembly for connecting an external power supply to the charging circuit. The charging circuit is coupled to the battery and comprises: an AC power input device to receive AC supply power; a voltage dropping and power supply rectifying device connected to the AC power input device to drop the AC power supply voltage and to convert the AC supply power into DC supply power; a voltage detection power supply control device which detects the voltage of the battery and automatically cuts off the supply power from the battery when the battery is charged to its saturation point; and, an electronic switch connected between the voltage dropping and power supply rectifying device and controlled by the voltage detection and power supply control device to charge the battery.

DETAILED DESCRIPTION OF THE PREFERRED EMBODIMENTS

Figure 1:
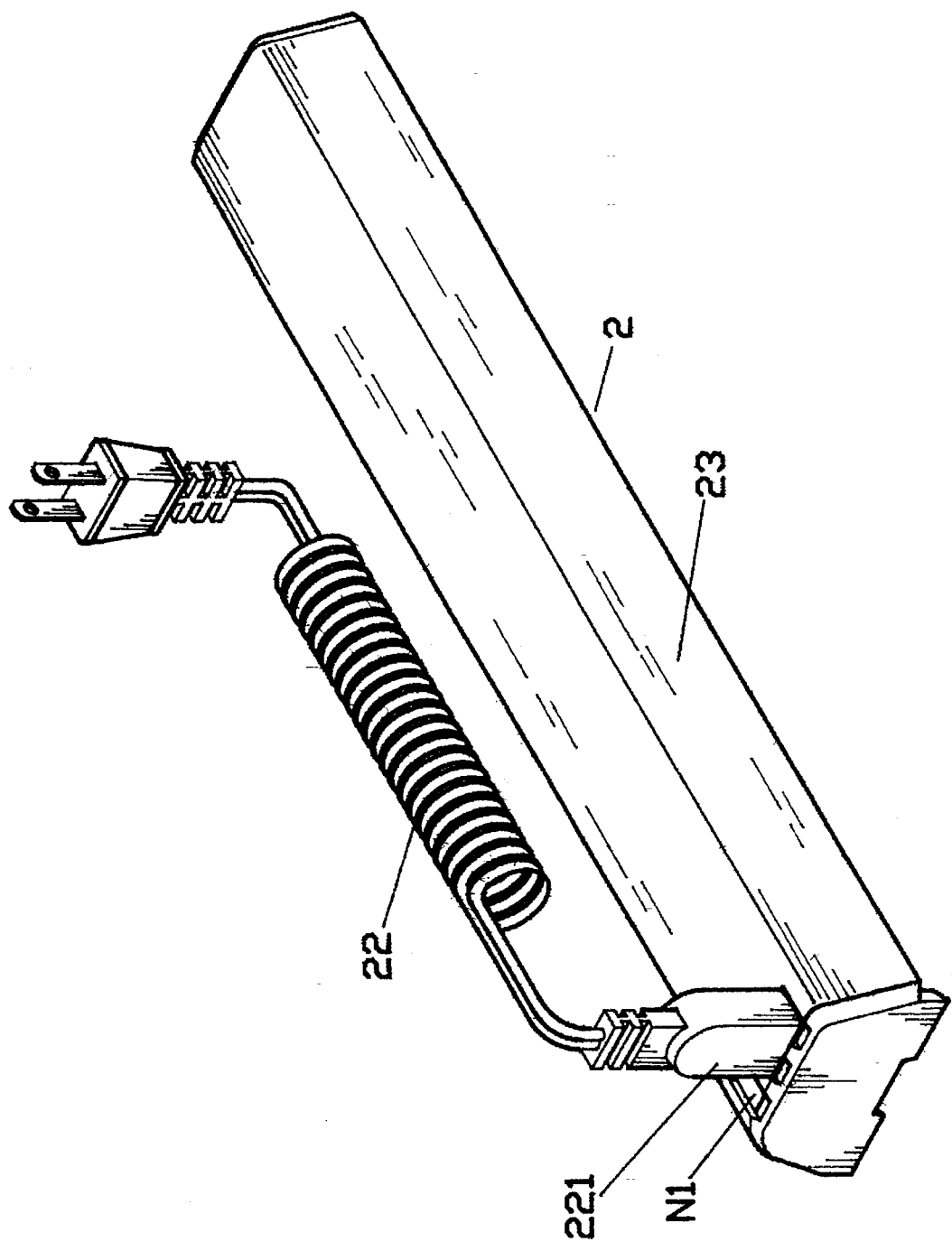
FIG. 1 is a perspective view of a rechargeable battery assembly according to the present invention.

Referring to FIG. 1, a rechargeable battery assembly in accordance with the present invention generally comprises a battery pack 2, a charging circuit 1 (FIG. 2) housed therein, and a power cord attachment 22.

Figure 2:
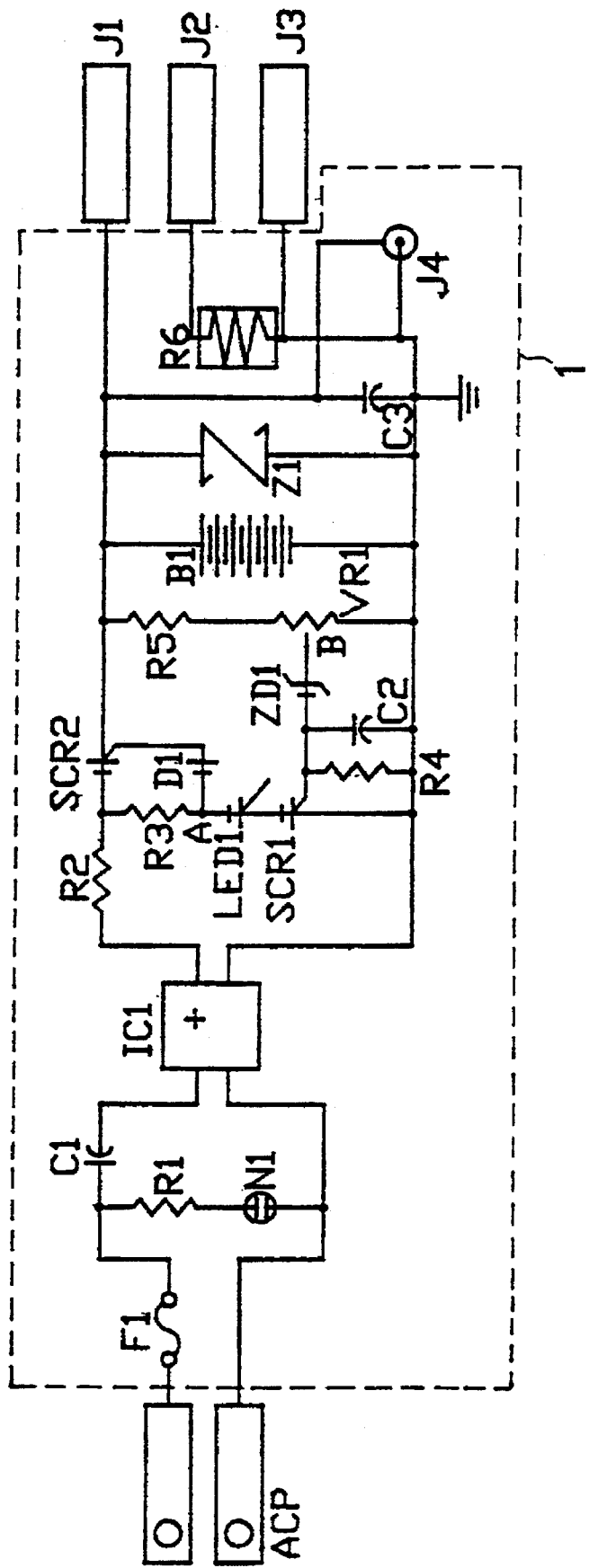
FIG. 2 is a circuit diagram of the charging circuit of the rechargeable battery assembly according to the present invention.
Figure 3:
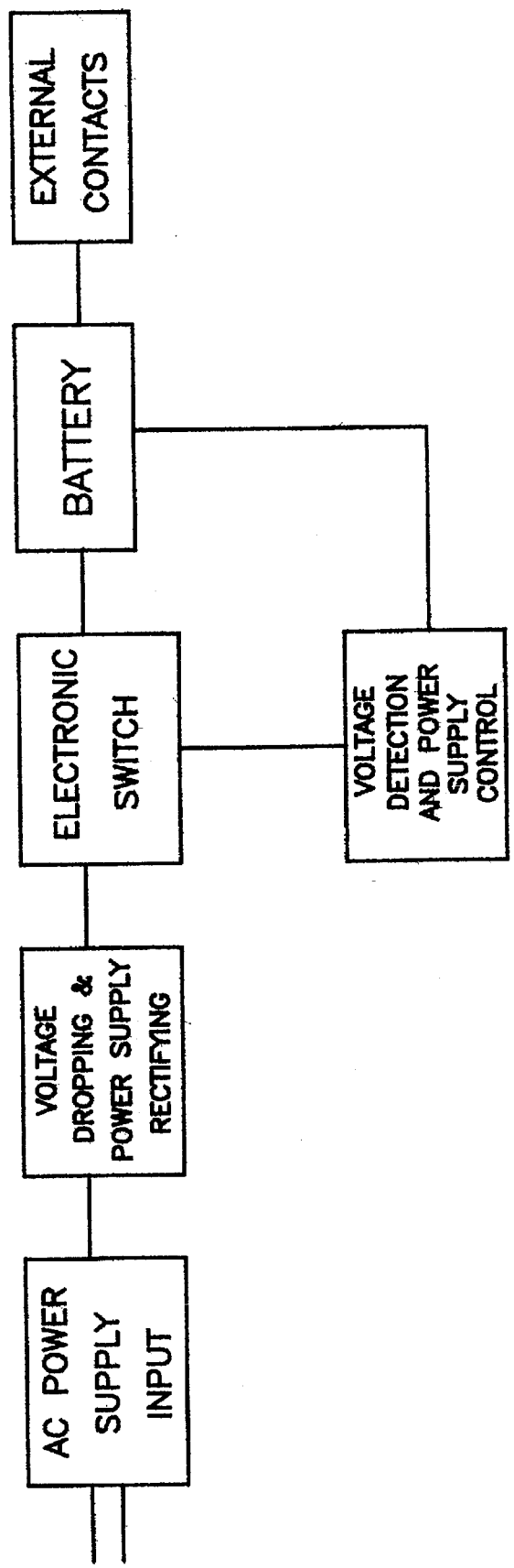
FIG. 3 is a circuit block diagram of the rechargeable battery assembly according to the present invention.

Referring to FIGS. 1–2, the charging circuit 1 uses capacitors to drop voltage and electronic devices to detect voltage and control power supply. FIG. 2 shows in schematic form a preferred embodiment of the charging circuit 1. When the charging circuit 1 is operated, AC power is applied to a capacitor C1 coupled to a bridge rectifier IC1, which changes AC to DC. The DC signal produced at the output of the bridge rectifier IC1 is passed through a current-limit resistor R2, through the controlled current path of a silicon controlled rectifier SCR2, and to the battery for its charging. The gate of the silicon controlled rectifier SCR2 is connected to the node connecting a resistor R3 and a light emitting diode D1. A bias voltage generated at this node allows electric current to pass through SCR2 to the battery during the charging operation of the charging circuit 1. As the voltage of the battery rises, the voltage across the variable resistor VR1 is increased. When the battery is fully charged to saturation, the voltage at the contact point B reaches the rated voltage of the zener diode ZD1, and the zener diode ZD1 conducts current, causing a bias voltage to be applied at the gate of a silicon controlled rectifier SCR1, which then turns on. This causes the contact point A to be grounded (the contact point A is short-circuited when the silicon controlled rectifier SCR1 is electrically connected). The gate of the silicon controlled rectifier SCR2, then, also becomes grounded. The silicon controlled rectifier SCR2 is thereby turned off, cutting off the passage of electric current to the battery. When the conduction path through SCR2 is so cut off, current passes through the resistor R3, causing the green light emitting diode LED1 to turn on, so as to provide a visual indication that the battery charging is completed (see FIG. 2).

External contacts J1–J3 are, in configuration and relative disposition, of the type typically found in conventional mobile telephone batteries. This enables the rechargeable battery assembly to compatibly interface with conventional mobile telephones. The external contact J4 is a receptacle for connection by electric cable to an automobile cigarette lighter socket (see FIG. 6), or for connection to a battery discharger (see FIG. 7) for discharging of the battery. Fully discharging the battery three or four times a month by use of this contact J4 substantially eliminates battery memory effect.

Figure 4:
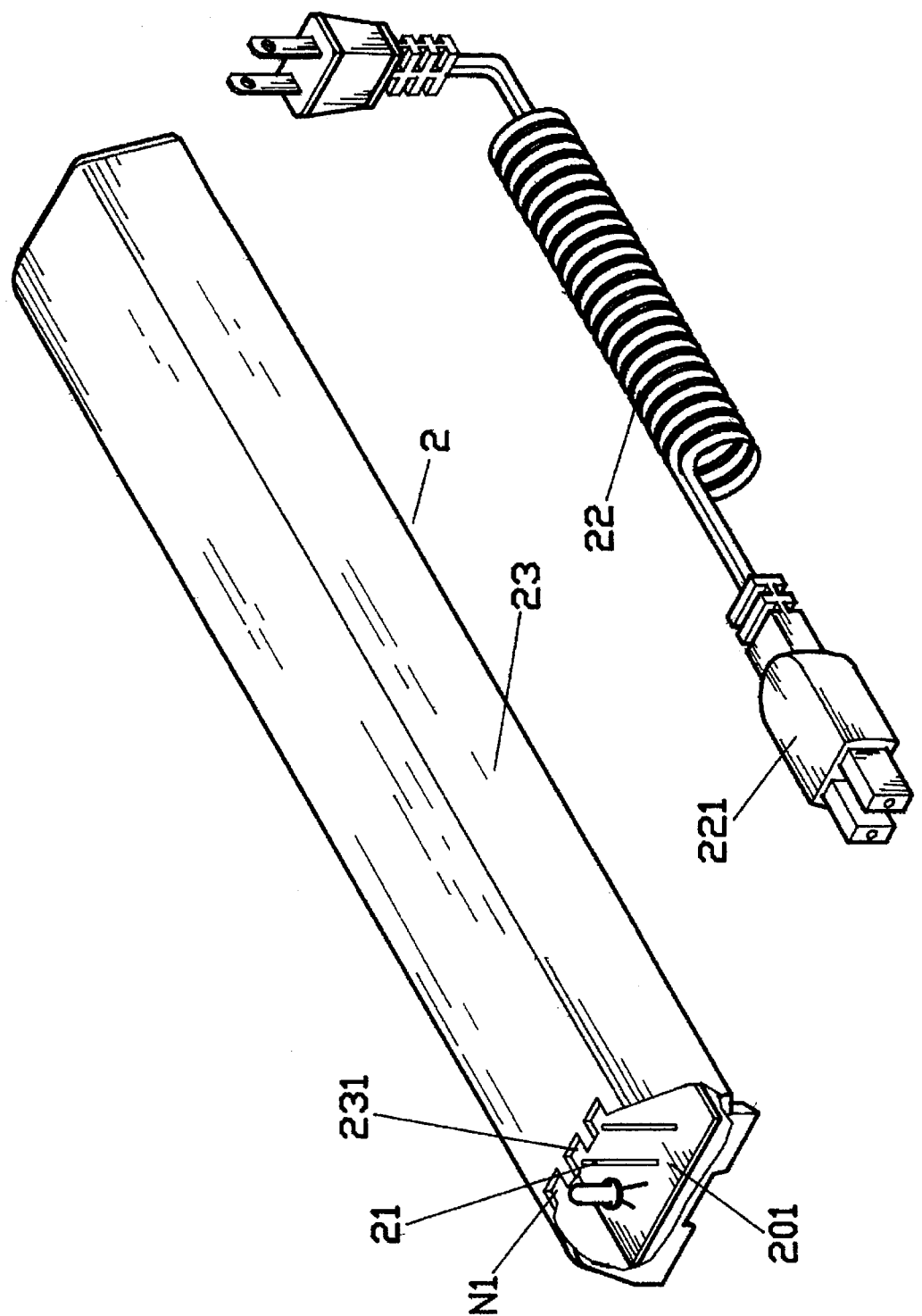
FIG. 4 is a perspective view of the rechargeable battery assembly shown in FIG. 1, partially cut-away, with the power cord attachment shown disconnected.
Figure 5:
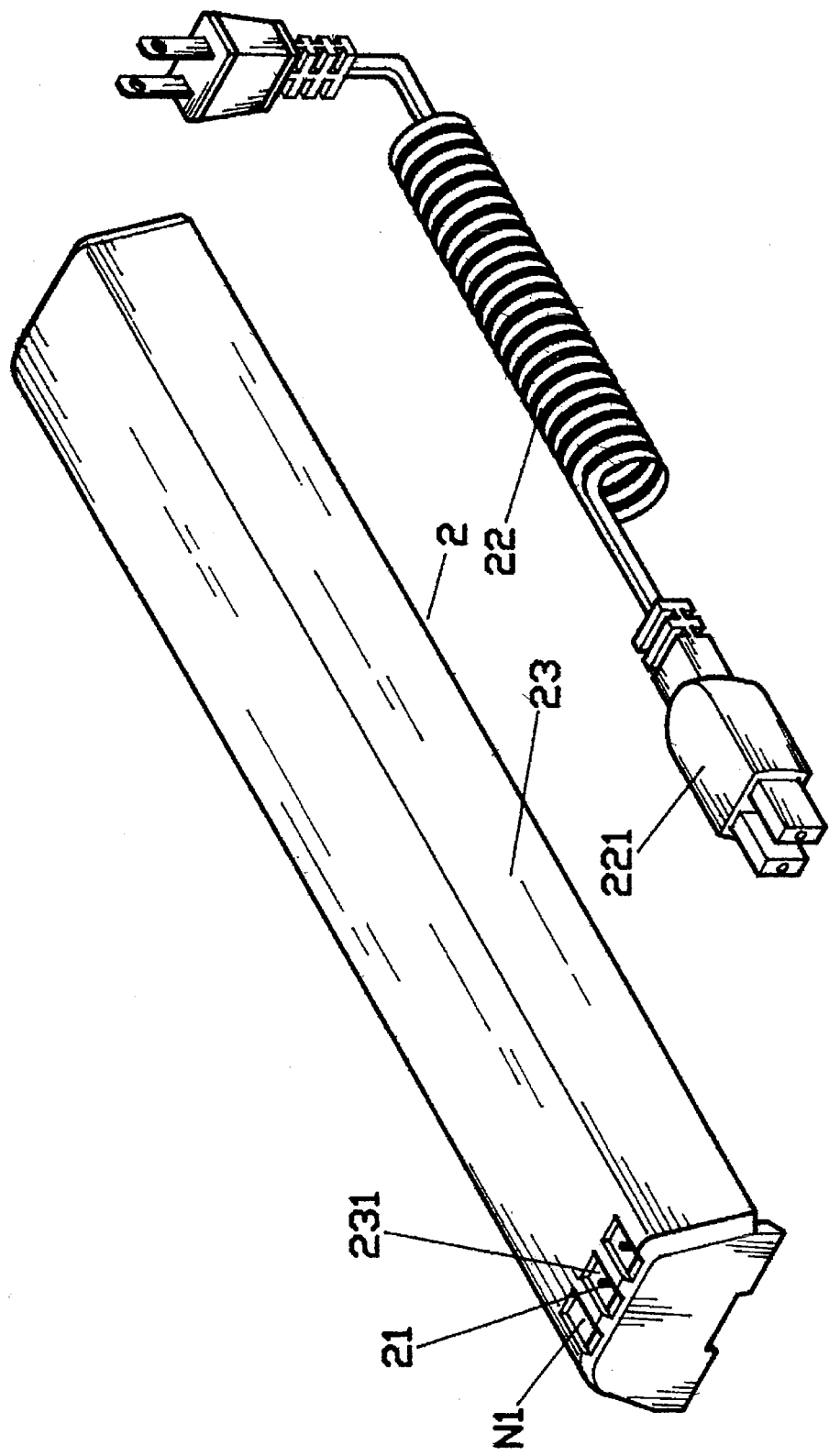
FIG. 5 is a perspective view of the rechargeable battery assembly of FIG. 1, with the power cord attachment shown disconnected.

Referring to FIGS. 4 and 5, the battery pack 2 comprises a shell 23 having two plug holes 231, a circuit board 201 mounted inside the shell 23 having two contact pins 21 disposed at its power input end aligned respectively with the plug holes 231, and a power cord attachment 22 having a receptacle plug 221 at one end for connection to the contact pins 21 in the plug holes 231. The opposite end of the power cord attachment 22 has coupled thereto a plug for connection to an AC power supply outlet.

Figure 6:
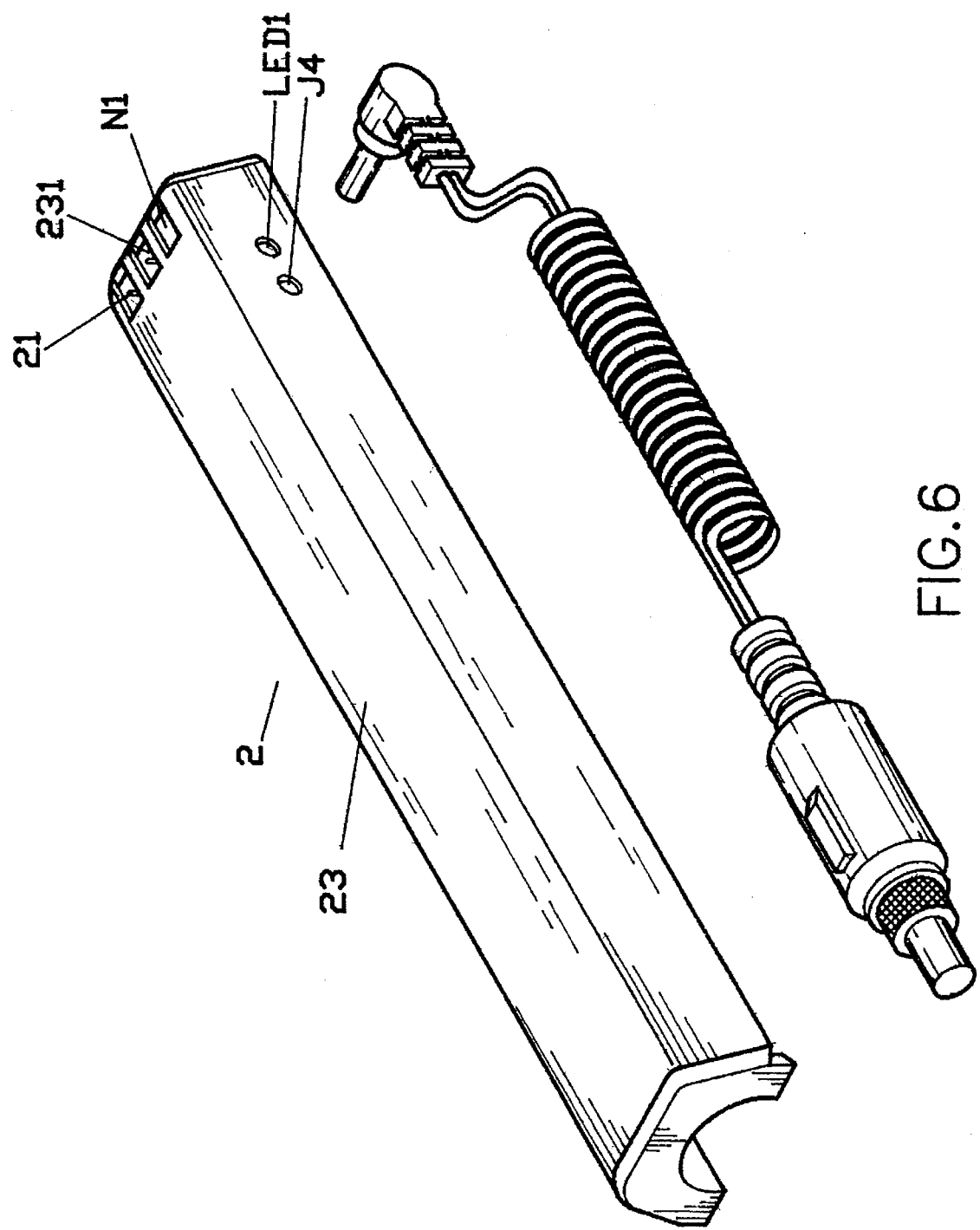
FIG. 6 is a perspective view of the rechargeable battery assembly according to the present invention, with an automobile lighter socket power adaptor shown disconnected; and, FIG. 7 is a perspective view of the rechargeable battery assembly according to the present invention, with a battery discharger shown disconnected.

Referring to FIG. 6, there is shown an alternate mechanism with which the rechargeable battery assembly may be charged. As an alternative to charging by connection to a 110 V AC power supply, the battery assembly may be charged by connection to a 12 V DC automobile battery power supply. An adaptor cord which enables such a connection to automobile—provided DC power is shown.

When electric supply power is connected, the yellow light N1 is turned on, and the battery charging operation is begun. When the battery is charged to saturation, the green light LED1 is turned on, and electric supply power is automatically cut off.

Figure 7:
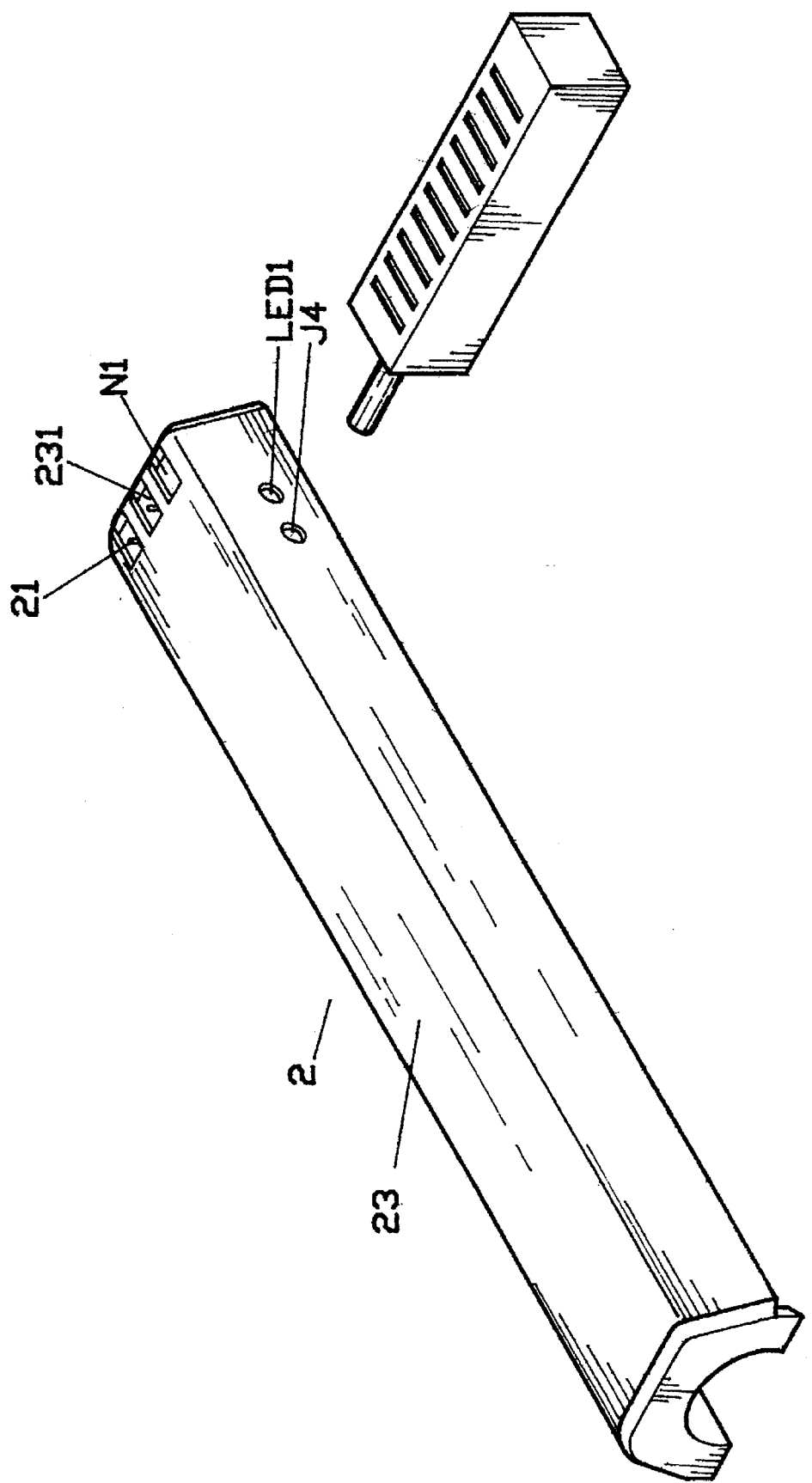

Referring to FIG. 7, if a reduction in battery capacity occurs because of battery memory effect, a battery discharger may be connected to the contact J4 to discharge the battery. A conventional discharger operable for this purpose is shown disconnected.

What is claimed is:

1. A combined rechargeable battery and charger assembly comprising:
   (a) a housing member having a power input end, said housing member having formed therein adjacent said power input end electric connection means;
   (b) a rechargeable battery enclosed within said housing;
   (c) a power cord adapted to electrically couple said electric connection means of said housing member to an AC power source; and,
   (d) a charging circuit enclosed within said housing and coupled to said electric connection means, said charging circuit including:
      (1) power input means selectively coupled to said rechargeable battery, said power input means being adapted to voltage limit an AC power signal received from said AC power source and to rectify said AC power signal to generate therefrom a DC power signal, said power input means including:
         i. an input capacitor for limiting the voltage of said AC power signal;
         ii. a bridge rectifier coupled to said input capacitor for converting said AC power signal to said DC power signal; and,
         iii. a first resistor coupled to said bridge rectifier for limiting the current of said DC power signal; and,
      (2) automatic control means coupled to said rechargeable battery and to said power input means to detect the voltage of said rechargeable battery and to selectively decouple electrically said power input means from said rechargeable battery responsive to said detection of said rechargeable battery voltage, said automatic control means including:
         i. a first silicon-controlled rectifier having a control gate terminal and a conduction path coupled between said power input means and said rechargeable battery;
         ii. a second resistor coupled to said control gate terminal of said first silicon-controlled rectifier;
         iii. a light emitting diode being coupled to said second resistor and to said control gate terminal of said first silicon-controlled rectifier at a bias node;
         iv. a variable resistor coupled to said rechargeable battery, said variable resistor being adapted to exhibit increasing voltage thereacross responsive to an increase in voltage across said rechargeable battery;
         v. a zener diode having first and second terminals, said first terminal being coupled to said variable resistor at a contact point, said zener diode being adapted to electrically conduct responsive to the voltage at said contact point exceeding a predetermined voltage; and,
         vi. a second silicon-controlled rectifier having a control gate terminal coupled to said second terminal of said zener diode, said second silicon-controlled rectifier having a conduction path connected between said light emitting diode and electric ground, said second silicon-controlled rectifier being adapted to conduct electric current through said conduction path thereof upon conduction through said zener diode, said electric conduction through said second silicon-controlled rectifier conduction path causing electric conduction through said light emitting diode and preventing electric conduction through said conduction path of said first silicon-controlled rectifier.

2. The combined rechargeable battery and charger assembly as recited in claim 1 wherein said charging circuit includes a plurality of output terminals for coupling said rechargeable battery to the power input terminals of a mobile telephone and an external contact adapted to alternatively couple to a DC power cord for operably connecting said charging circuit to an automobile power outlet or a battery discharger for discharging said rechargeable battery.

\* \* \* \* \*